(12) United States Patent
Hernandez

(10) Patent No.: US 6,841,984 B2
(45) Date of Patent: *Jan. 11, 2005

(54) POWER SOURCE REGULATOR FOR WIRELINE CABLE SYSTEM

(75) Inventor: Ramon Hernandez, Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/339,045

(22) Filed: Jan. 9, 2003

(65) Prior Publication Data

US 2003/0098673 A1 May 29, 2003

Related U.S. Application Data

(63) Continuation of application No. 09/951,759, filed on Sep. 11, 2001, now Pat. No. 6,522,119.

(51) Int. Cl.⁷ .............................. G05F 5/02; H04M 19/06
(52) U.S. Cl. ...................................... 323/324; 379/413
(58) Field of Search ................................ 323/324, 246, 323/282, 284, 285; 379/412, 413

(56) References Cited

U.S. PATENT DOCUMENTS

| 5,081,411 A | * | 1/1992 | Walker ........................ 323/324 |
| 5,237,264 A | * | 8/1993 | Moseley et al. ............. 323/324 |
| 5,530,748 A | * | 6/1996 | Ohmori ....................... 379/413 |
| 6,522,119 B1 | * | 2/2003 | Hernandez ................... 323/324 |

* cited by examiner

*Primary Examiner*—Jessica Han
(74) *Attorney, Agent, or Firm*—Pehr B. Jansson; Robin Nava; Brigitte Echols

(57) ABSTRACT

A system (150) for controlling voltage supplied to a transmission line system. System (150) includes a transmission cable (134) having a characteristic impedance and a load impedance connected at its distal end. A power source (154) is connected to transmission cable (134). Power source (154) is configured to receive a voltage signal input (157) and to drive a source voltage $V_S$ based thereon. A feedback unit (155) is configured to receive the power source current ($I_S$) as an input and further configured to generate a feedback voltage ($V_F$) that varies with $I_S$. A set voltage unit (152) is configured to produce a substantially constant voltage ($V_{set}$) and an adder (153) is configured to add the set voltage ($V_{set}$) to the feedback voltage to generate the voltage signal (157) that provides the input to power source (154). The feedback unit (155) may include an impedance element (156) comprising a digital signal processor or other suitable circuit that models the short circuit impedance of the transmission line.

6 Claims, 4 Drawing Sheets ary at the control circuit's output, a regulator wanting to regulate a load voltage that is physically proximate to the control circuit's output must have an accurate measurement of the load voltage and means, such as a feedback cable, for routing the load voltage back to the regulator.

POWER SOURCE REGULATOR FOR WIRELINE CABLE SYSTEM

This application is a Continuation Application of U.S. patent application Ser. No. 09/951,759 filed on Sep. 11, 2001, now U.S. Pat. No. 6,522,119, the entire content of which is hereby incorporated by reference herein.

BACKGROUND

1. Field of the Present Invention

The present invention generally relates to the field of data acquisition systems and more particularly to a wireline logging system and method that includes dynamic control of the power supplied to a load based upon a model of the wireline system.

2. History of Related Art

Wireline logging refers generally to the surveying of oil or gas wells to determine their geological, petro-physical, or geophysical properties using electronic measuring instruments. The electronic instruments are conveyed into a wellbore with an armored steel cable, referred to as a wireline cable. Measurements made by downhole instruments secured to the wireline cable are transmitted back to a data processing system located at the surface through electrical conductors in the wireline cable. Electrical, acoustical, nuclear and imaging tools are used to stimulate the formations and fluids within the wellbore and the electronic measuring instruments then measure the response of the formations and fluids. The wireline cable provides also the electrical power required by the logging tools to operate.

From an electric power perspective, a wireline logging system may be viewed as an electrical circuit comprising a head resistance (Rh) representing the downhole instruments in series with an impedance element representing the wireline cable itself. If the wireline cable is modeled as a simple resistive element, FIG. 1 illustrates a circuit diagram of the system. In this simple model, a voltage source Vs is applied across the series combination of the cable resistance (Rc) and the head resistance Rh.

Two competing considerations govern wireline logging operations. On the one hand, it is desirable to maximize the power delivered to the head (tools) to maximize the rate of data acquisition and speed up operations in general. It is well known that maximum power is delivered to the load when the cable resistance Rc equals the head resistance Rh and the voltage at the head Vh is ½ the source voltage Vs. Under these conditions, however, the load voltage Vh varies by approximately 100% when the load impedance (Rh) goes from this minimum value to almost open circuit, which occurs when heavy loads are disconnected and only the control circuits remain powered. This variation is typically unacceptable for electronic circuits in general, and in wireline logging systems in particular. Some means of regulating the voltage supplied to the head is therefore required.

Referring now to FIG. 2, a block diagram representing a traditional voltage regulation system 120 is illustrated. Voltage regulation system 120 compares a measured value of the load voltage $V_L$ 122 against a set voltage $V_{set}$ 124 to determine an error signal 126. Error signal 126 is indicative of the difference between $V_L$ 122 and the $V_{set}$ 124. Error signal 126 is then typically provided to an error amplification element 128. Amplification element 128 typically includes an operational amplifier and may employ a proportional, integrating, and/or differentiating circuit depending upon the application. Amplification element 128 typically generates a source voltage $V_S$ from error signal 126 to maintain $V_L$ at the desired level (i.e., $V_{set}$).

A conventional voltage regulator such as system 120 requires an accurate measurement of the load voltage $V_L$ to implement the voltage control at the voltage source. In many applications where the load is located in proximity to the source voltage, feeding the load voltage back to the regulator circuitry presents no significant problem. In a wireline logging application, unfortunately, it is logistically impracticable to feed the load voltage back to the source because of the tremendous length of contemporary wireline cables. Even if the wireline cable were constructed to include a feedback cable to carry the load voltage signal back to the surface, the loss and delay that would characterize the feedback cable would result in a significantly degraded load signal. Accordingly, it would be highly desirable to implement a voltage control system that could be suitably employed in a wireline logging application and other applications characterized by great distances between the load and the voltage regulator. This system would preferably allow the operation of the cable at or near its maximum power carrying capacity, while minimizing the voltage variation at the input of the electronic circuits powered. It would be further desirable if the implemented solution did not substantially increase the cost or complexity of the wireline logging operation.

BRIEF DESCRIPTION OF THE DRAWINGS

Objects and advantages of the invention will become apparent upon reading the following detailed description and upon reference to the accompanying drawings in which.

Figure 1:
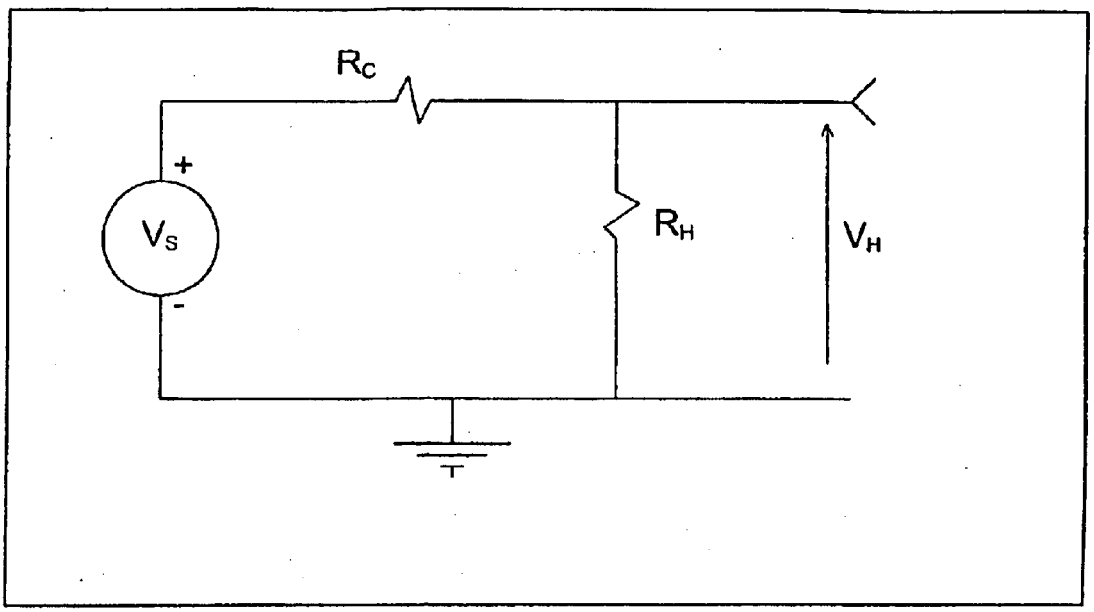
FIG. 1 is a circuit diagram of a resistive model of a wireline logging system.
Figure 2:
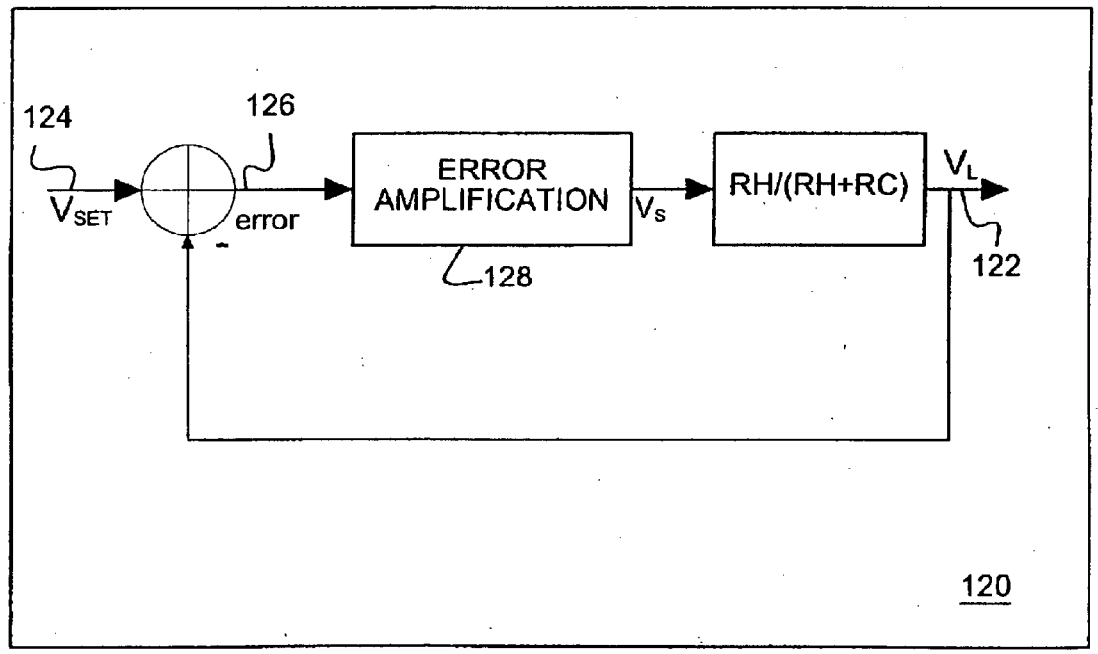
FIG. 2 is a canonical representation of an electrical system employing a voltage control mechanism to control the load voltage according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the invention is limited only by the language of the appended claims.

DETAILED DESCRIPTION OF THE INVENTION

Generally speaking, the present invention contemplates a system and method for controlling voltage at a load, such as the load at the end of a wireline cable, that is distant and effectively inaccessible from the control circuit. The invention incorporates a feedback unit configured to model the short circuit input impedance of the wireline cable itself. The current from the system's voltage source is provided to the feedback unit to create a feedback voltage that approximates the voltage drop that occurs along the cable. This feedback voltage is added to a set voltage where the set voltage equals the desired load voltage. By adding a voltage that is approximately equal to the voltage drop caused by the wireline cable to the set voltage, the invention uses positive feedback to control the load voltage in an environment when the load voltage itself cannot be effectively measured.

The system includes a control mechanism in which a signal measured at the voltage source provides the input to a circuit that models the impedance characteristics of the wireline cable. The output of the model circuit represents an approximation of the measured signal's effect on the load voltage in the actual wireline cable. This approximation is then used to alter the source voltage to cancel the effect on the load voltage caused by the cable's impedance. In one embodiment, the signal that provides the input to the cable model circuit is the source current. In this embodiment, the cable model circuit represents the short circuit input impedance of the cable, that is, the impedance of the cable when the load end of the cable is short circuited. This impedance may be measured empirically by characterizing the cable or by including the necessary measurement circuits into the system itself. When the source current is provided to this cable model circuit, the circuit generates a voltage offset signal that is representative of the voltage loss in the wireline cable. By adding this offset voltage to a set voltage, the voltage control system maintains the load voltage at the set voltage. A compensation circuit may be included in the feedback loop to improve the transient response and stability of the system.

Figure 3:
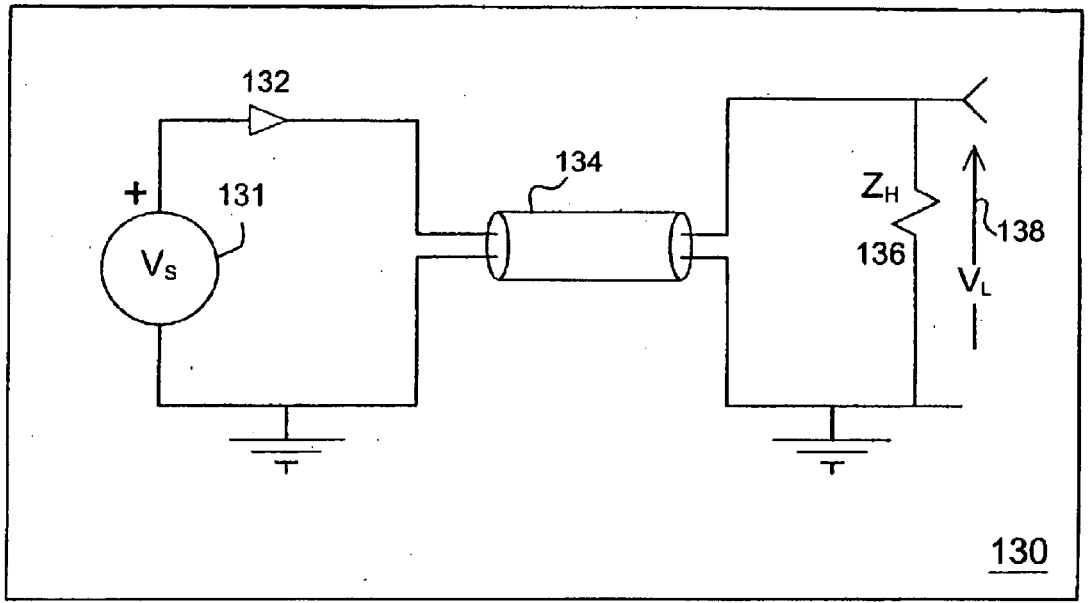
FIG. 3 is a model of a wireline logging system including a transmission line element representing the wireline cable.

In the resistive circuit model illustrated in FIG. 1, the source current is equal to the load current. In an actual wireline system, however, the wireline cable introduces signal loss and time delay into the system. Referring to FIG. 3, a circuit model of a wireline cable system 130 that includes a transmission line element 134 representing the wireline cable is depicted. The characteristic impedance of transmission line 134 is denoted as $Z_0$. The relationship between the source voltage $V_S$ 131, the source current $I_S$ 132, and load or head voltage $V_H$ 138 is:

$$V_H = [V_S/\cos h(\gamma l)][Z_H/(Z_H + Z_0 \tan h(\gamma l))] \quad \text{Equation 1}$$

$$I_S = [V_S/Z_0][(Z_0 + Z_H \tan h(\gamma l))/(Z_H + Z_0 \tan h(\gamma l))] \quad \text{Equation 2}$$

where l is the length of transmission cable 134 and $\gamma$ is the cable's propagation constant. Rearranging Equations 1 and 2 and substituting K for $\gamma l$ yields:

$$Z_H = Z_0[V_S - Z_0 I_S \tan h(K)]/[Z_0 I_S - V_S \tan h(K)] \quad \text{Equation 3}$$

$$V_H = (V_S - I_S Z_0 \tan h(K))\cos h(K) \quad \text{Equation 4}$$

The input impedance of the transmission cable when the load or distal end is short circuited is denoted herein as the short circuit input impedance $Z_{is}$. Given the cable's propagation constant $\gamma$ and the transmission cable length l, the short circuit input impedance $Z_{is} = Z_0 \tan h(K)$. Substituting for $Z_0 \tan h(K)$ in Equation 4 yields:

$$V_H = (V_S - I_S Z_{is})\cos h(K) \quad \text{Equation 5}$$

Substituting the expression $V_{set}/\cos h(K) + I_S Z_{is}$ for $V_S$ in Equation 5 yields:

$$V_H = V_{set} \text{ (when } V_S = V_{set}/\cos h(K) + I_S Z_{is}) \quad \text{Equation 6}$$

Equation 6 suggests that one may maintain the load voltage $V_H$ at approximately a desired voltage ($V_{set}$) by driving the wireline cable with a voltage ($V_S$) equal to $V_{set}$ plus a feedback voltage, where the feedback voltage is a function of the voltage source current ($I_S$). Under steady state conditions and a useful range of low frequencies, the $\cos h(K)$ factor is approximately equal to 1 and the load voltage $V_H$ is substantially equal to $V_{set}$. The $\cos h(K)$ factor represents transmission line losses and delay. While the line losses can be compensated for, compensating for delay could be achieved only if the current variations are anticipated. Since this is a theoretical impossibility, the $\cos h(K)$ factor does place a limit on the maximum frequency at which the feedback unit can track changes in the load impedance. Nevertheless, because the voltage source current $I_S$ is readily measurable at the surface, Equation 6 implies a control circuit that is useful over a wide range of frequencies and does not require a value, such as the load voltage, that is only obtainable at the load.

Figure 4:
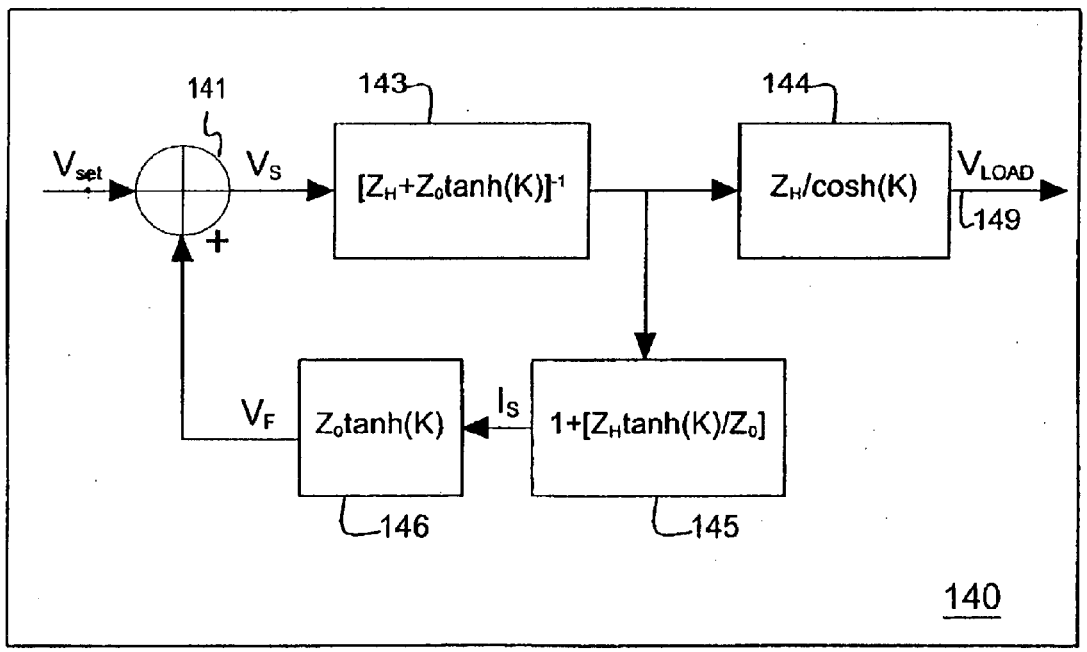
FIG. 4 is a canonical representation of a transmission line system according to one embodiment of the invention.

Referring now to FIG. 4, a canonical model of a wireline logging system employing the feedback control suggested by Equation 6 is presented. In this model, a power supply 141 or other voltage source drives the wireline cable with a source voltage $V_S$. The relationship between the load voltage $V_H$ and the source voltage $V_S$ as indicated in Equation 1 is reflected by blocks 143 and 144. The relationship between the source current $I_S$ and the source voltage $V_S$ according to Equation 2 above is reflected in blocks 143 and 145. It should be noted that, in this canonical representation, blocks 143, 144, and 145 do not correspond to physical circuits in the system, but instead represent the relationship between the various input and output parameters of the system. The feedback voltage $V_F$ is a function of the source current $I_S$ and the short circuit line impedance $Z_{is} = Z_0 \tan h(K)$ as reflected in block 146. The feedback voltage $V_F$ is added to a set voltage $V_{set}$ to produce the source voltage $V_S$ that drives the wireline cable.

The short circuit line impedance $Z_{is}$ can be determined empirically during cable characterization, or the necessary circuits may be included in the system to perform the required measurement(s) at power up or periodically during operation. The feedback voltage $V_F$ approximates the voltage drop along the transmission line at the source current. By adding this voltage drop to the set voltage $V_{set}$, the load voltage is maintained at approximately the set voltage where the approximation is highly accurate at steady state and low frequency conditions.

If a Nyquist plot is determined for an actual wireline cable loaded with a resistor that matches the resistance of the wireline, the plot would enclose the −1 point on the complex plane thereby indicating instability. To stabilize voltage control circuit 140, a pole in the feedback loop can provide the necessary stability compensation.

Figure 5:
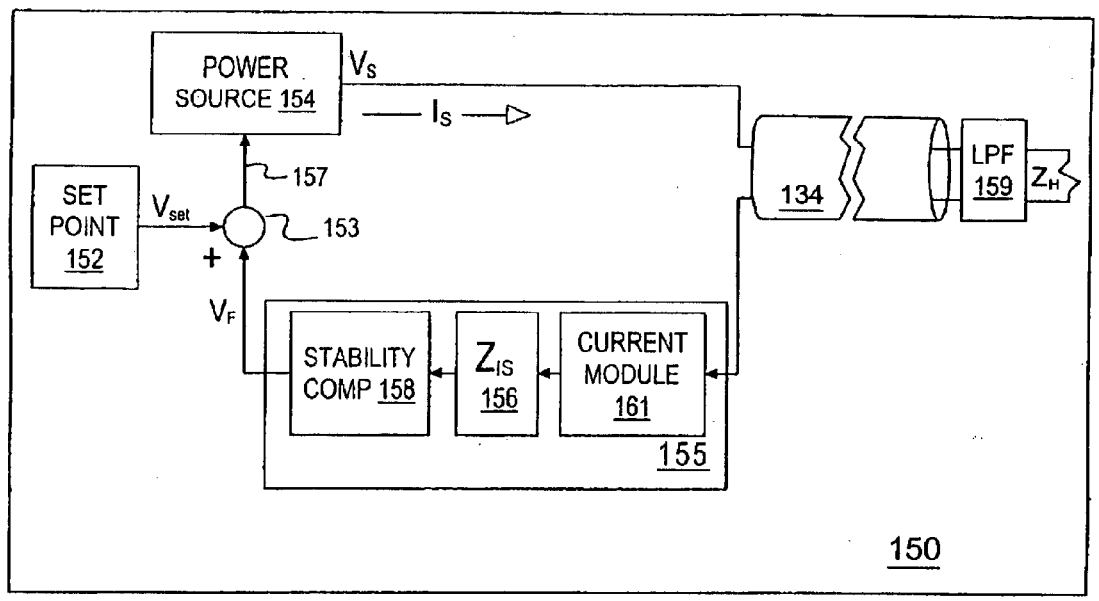
FIG. 5 is a block diagram illustrating an embodiment of the system represented in FIG. 4.

Referring now to FIG. 5, a block diagram of an embodiment of a system 150 for driving a wireline cable system is depicted. In the depicted embodiment, system 150 includes a set point unit 152 that generates a controlled voltage $V_{set}$. Set point unit 152 may be implemented with a Zener diode circuit or any other suitable technique for generating an analog reference voltage signal. In another embodiment, set point unit 152 may simply generate a signal indicative of $V_{set}$ rather than producing an actual voltage. If, for example, portions of system 150 are implemented with a digital signal processor (DSP), set point unit 152 may comprise a portion of the DSP that generates a digital value representative of $V_{set}$. This digital value could be converted to $V_{set}$ by a digital-to-analog converter (DAC) or provided directly to a digitally controlled power source. The output of set point unit 152 provides a first input to an adder unit 153.

Adder unit 153 receives a second input from the output of a feedback unit 155 that generates a feedback voltage signal indicative of the feedback voltage $V_F$. Like set point unit 152, adder unit 153 may comprise a portion of a DSP that produces a signal comprising a digital value that is indicative of a corresponding voltage. Adder unit 153 generates a voltage signal 157 that provides an input to a power source.

Typically, power source 154 is a modulating power supply that produces an output voltage $V_S$ that is proportional to the input voltage. In one embodiment, power source 154 may be implemented as a switching mode power supply (also referred to as a switching converter) that provides a power supply function using low loss components such as capacitors, inductors, and transformers, and a set of 2-state switches. Power source 154 may be a digitally controlled power source. In this embodiment, the voltage signal 157 may comprise a digital value indicative of a voltage rather than an actual voltage level.

Figure 6:
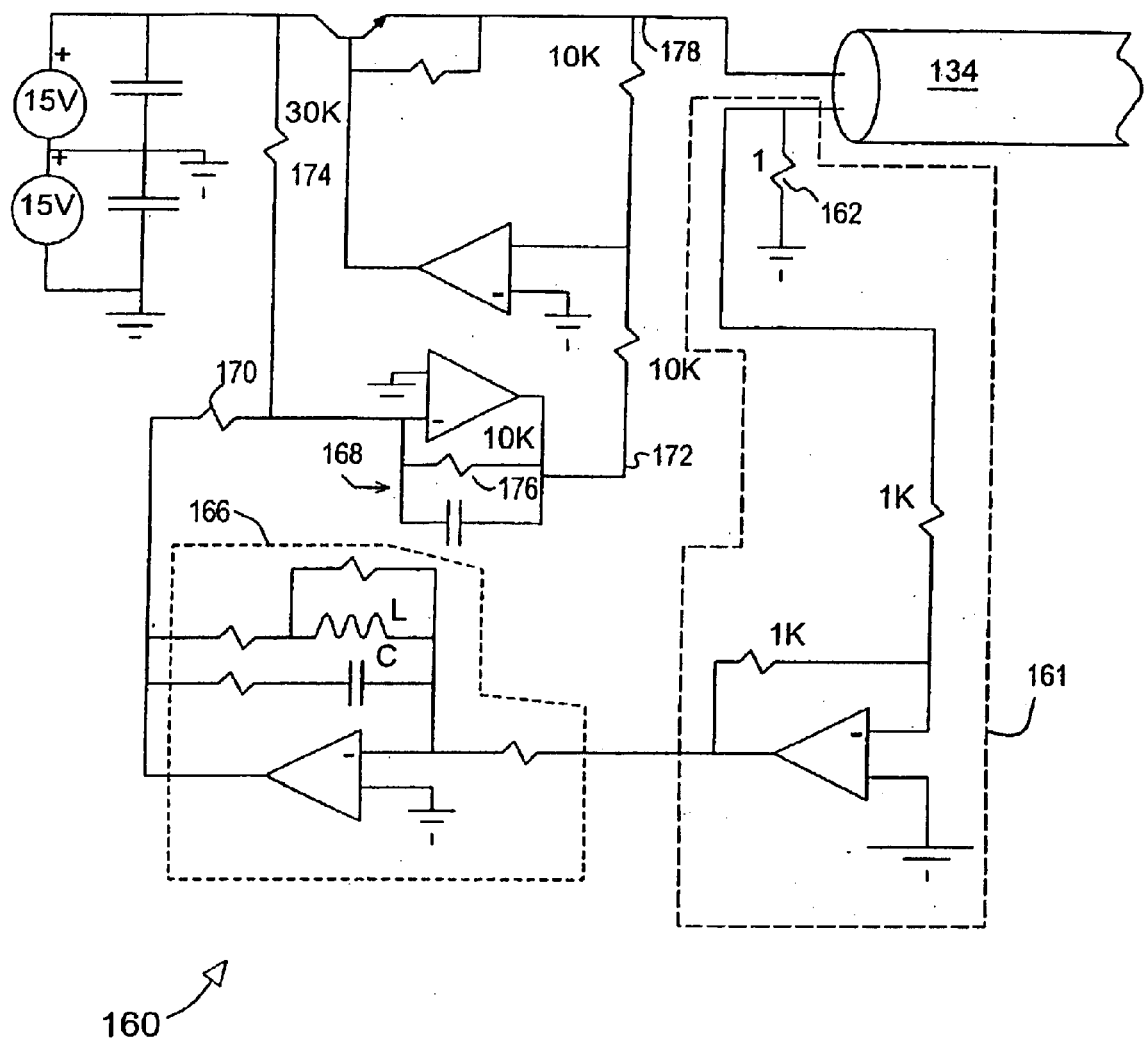
FIG. 6 is a circuit diagram illustrating additional detail of an implementation of the system of FIG. 5.

The feedback unit 155 is driven by the source current $I_S$ generated by power source 154. Feedback unit 155 generates a feedback voltage signal. The feedback voltage signal may be an analog signal having a voltage equal to the feedback voltage $V_F$. In another embodiment, the feedback voltage signal may comprise a digital value that is indicative of the feedback voltage $V_F$. In the depicted embodiment, feedback unit 155 includes, a current measurement module 161, an impedance element 156, and a frequency compensation element 158. Current measurement module 161 includes a circuit that determines the magnitude of the source current $I_S$ and provides a signal to impedance element 156 that indicates the determined current. In one embodiment, the impedance element 156 is designed to have an impedance that closely matches the short circuit input impedance $Z_{is}$ of the wireline cable. In another embodiment, impedance element 156 may model the DC component of the short circuit input impedance (i.e., the DC resistance). This implementation represents a tradeoff in performance for simplicity and cost of implementation. The stability compensation element 158 is designed to improve the transient response and stability of the circuit. Feedback unit 155 may be entirely or partially implemented with a suitably programmed DSP. Referring to FIG. 6, a representative schematic of a circuit 160 suitable for implementing the system 150 of FIG. 5 is depicted. In the depicted embodiment, current measurement module 161 of FIG. 5 is implemented with a low ohm resistor, such as 1Ω resistor 162 tied between the transmission cable 134 and ground such that the voltage across resistor 162 in volts is equal to the source current $I_S$ in amperes. The depicted embodiment of module 161 further includes operational amplifier circuit that provides an inverting and isolation function that is specific to the depicted implementation. The impedance element 156 of FIG. 5 is implemented as an RLC circuit 166 that models the short circuit line impedance of the wireline cable. The output of circuit 166 is combined via resistor 170 with a reference voltage.

The reference voltage circuit includes the 15V voltage sources and their corresponding capacitors. Without the feedback voltage generated by RLC circuit 166, the resistors 174 and 176 produce a reference voltage ($V_{set}$) on node 172 under steady state conditions. With the feedback voltage generated by circuit 166, node 172 varies around the set voltage in response changes in the source current $I_S$. The voltage source node 178, which represents the source voltage $V_S$ that drives the wireline cable mirrors the voltage on node 172 such that, as the voltage of node 172 varies in response to varying values of feedback voltage, the source voltage $V_S$ on node 178 varies as well. The integrator circuit 168 provides stability compensation. When the load impedance varies significantly, the source current increase or decrease will cause a corresponding increase or decrease in the feedback voltage, which causes the source voltage to increase or decrease to keep the load voltage at a relatively constant value.

It will be appreciated that the circuit elements depicted in FIG. 6 may be implemented with more advanced technology than the discrete components depicted. A DSP, for example, could be implemented to optimize circuit response time and stability. The DSP could, for example, provide a more accurate replication of the wireline cable impedance and the stability circuitry. In addition, alternative embodiments of the invention may employ proportional, differential, or integrating feedback elements in feedback unit 155. Moreover, load voltage variations could be further limited by employing a passive low pass filter 159 between the cable and load impedance $Z_H$ or in parallel with the load impedance that would slow down the effects of fast load impedance $Z_H$ changes.

It will be apparent to those skilled in the art having the benefit of this disclosure that the present invention contemplates a voltage control system and method suitable for use in a wireline logging application. It is understood that the form of the invention shown and described in the detailed description and the drawings are to be taken merely as presently preferred examples. It is intended that the invention is limited only by the claim language.

What is claimed is:

1. A method of controlling load voltage in an electronic system including a transmission cable comprising:

driving the electronic system with a source voltage (VS) derived by a voltage source from an input to the voltage source;

modeling a characteristic of the transmission cable;

measuring an input variable to the electronic system;

applying the measured variable to the cable model to generate a feedback voltage (VF); and combining the feedback voltage signal with a set voltage (Vset) to produce the source input.

2. The method of controlling load voltage in an electronic system including a transmission cable of claim 1 wherein the input variable is source current ($I_S$) produced by the voltage source.

3. The method of controlling load voltage in an electronic system including a transmission cable of claim 2 wherein the combining step comprises:

adding the feedback voltage signal to a set voltage signal indicative of a set voltage ($V_{set}$) to produce the voltage source input.

4. The method of controlling load voltage in an electronic system including a transmission cable of claim 1 wherein the combining step comprises:

adding the feedback voltage signal to a set voltage signal indicative of a set voltage ($V_{set}$) to produce the voltage source input.

5. An electronic system comprising a transmission cable having a characteristic impedance $Z_O$ and a load impedance $Z_H$ at a distal end of the cable;

a power source connected to the transmission cable and configured to receive a signal input and to drive a source voltage $V_S$ based thereon;

a feedback unit configured to receive an input variable to the electronic system and further configured to generate a feedback voltage signal based thereon;

a set voltage unit configured to produce a substantially constant voltage signal; and an adder configured to add the set voltage signal to the feedback voltage signal to generate the voltage signal that provides the input to power source.

6. The electronic system of claim 5 wherein the input variable is source current ($I_S$) produced by the voltage source.

* * * * *